June 27, 1967  L. O. VARGADY  3,327,585
OPTICAL SYSTEM
Filed Sept. 20, 1963
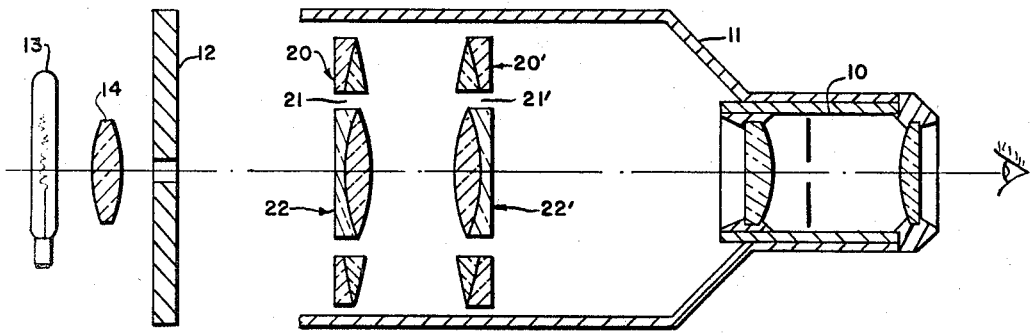
FIG. 1
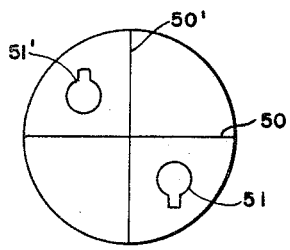
FIG. 5
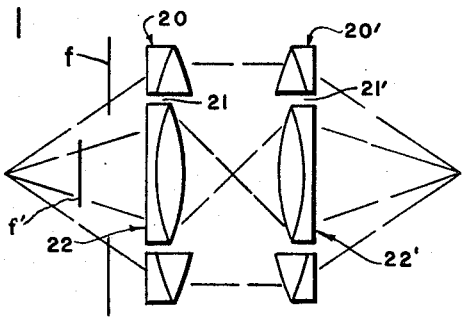
FIG. 2
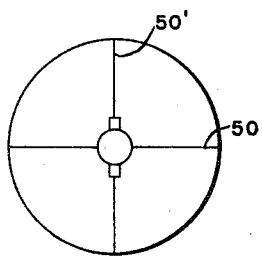
FIG. 6
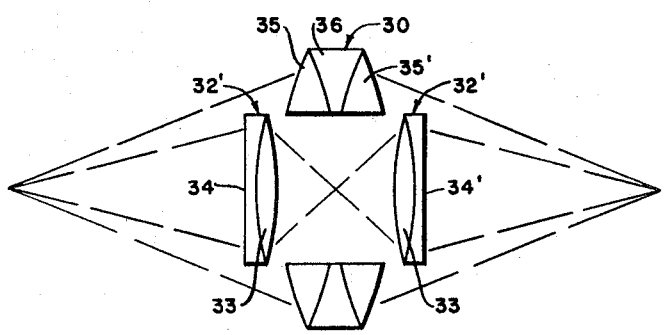
FIG. 3
FIG. 4
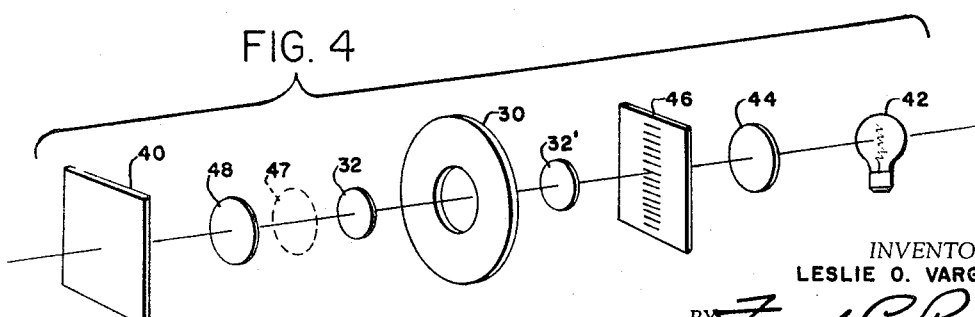
INVENTOR.
LESLIE O. VARGADY
ATTORNEYS 3,327,585
OPTICAL SYSTEM
Leslie O. Vargady, Covina, Calif., assignor to Bausch & Lomb Incorporated, Rochester, N.Y., a corporation of New York
Filed Sept. 20, 1963, Ser. No. 310,426
5 Claims. (Cl. 88—14)

This invention relates to a novel optical system and more particularly to a novel optical system which may be used for centering an element with respect to the optical axis of the system or for indicating changes in the position of a movable element with respect to the axis of the system.

Toolmaker's microscopes facilitate series of measurements on a workpiece, that could otherwise be accomplished by relatively complex and time consuming methods. In the typical application these microscopes provide means to measure parts, location of holes, center points etc., where the position of the measured points are determined in coordinates. The requirements for such measurements call for accurate and efficient devices which are relatively easy to use.

The development of the toolmaker's microscope and similar instruments led to the use of double image prism devices which are widely known. Such devices are effective to double the accuracy of a conventional toolmaker's microscope in setting an object relative to an axis. However, the double image prism devices utilize elaborate and expensive prism systems and accordingly have had only limited commercial acceptance because of their relatively high price.

Advantageously, an optical system according to the present invention provides the double image along with the advantages inherent therein at a relatively small cost. For example, an optical system according to the present invention may be incorporated in a toolmaker's microscope at a cost which is substantially less than a complex prism system. Even though there is only a relatively small increase in cost incurred in a device which incorporates the present invention, it is possible to maintain other desirable features which are incorporated in conventional devices. For example, the accuracy, efficiency, and ease of use have been at least maintained or improved by incorporating the present system in various devices.

Furthermore, the systems according to the present invention have been found to have a wide range of applications. Such systems may be advantageously incorporated in a scale read-out system, projection system such as a contour projector, telescopes, bombsights, and other optical instruments wherein an increase in the accuracy in setting or measuring a movable element with respect to a fixed axis is desirable.

Briefly, a device according to the present invention comprises means including a plurality of optically aligned lenses for forming mutually reversed images. These images are reversed with respect to each other and when the object is aligned with the optical axis of the system, the images are superimposed upon each other.

The system according to one preferred embodiment comprises two coaxial lens systems each of which forms a real image of an object at a common plane. The first or outer lens system includes a positive annular or ring-like lens defining an opening therein. The opening is on the common optical axis of the outer and inner imaging system. The inner system includes a pair of positive lenses which are spaced apart and cooperatively form an image of the object at the same focal plane as the outer lens system. The inner lens system also forms a reversed intermediate image where the boundary rays of the inner system cross each other in the interlens space.

Both inner and outer imaging systems are preferably symmetrical in form, and can be designed to deliver a corrected achromatic image according to the changing needs of the various applications, in accordance with the practice and skill of a lens designer.

The invention will now be described in more detail in connection with the accompanying drawings; in which, FIG. 1 is a schematic cross sectional view of a toolmaker's microscope which incorporates an optical system according to one embodiment of the invention;

FIG. 2 is a diagrammatic view illustrating the optical system which is shown schematically in FIG. 1;

FIG. 3 is a diagrammatic view illustrating another embodiment of the invention;

FIG. 4 is a perspective view of an optical read-out system which incorporates the optical system shown in FIG. 3;

FIG. 5 illustrates an image formed on a screen by an optical system according to the invention; and, FIG. 6 illustrates an image formed on a screen by an optical system according to the invention when a preselected centered position is obtained.

The first embodiment of the invention is shown more clearly in FIGS. 1 and 2. FIG. 1 is a schematic illustration of a toolmaker's microscope including an optical system such as the one shown in FIG. 2. The microscope includes a conventional eyepiece assembly 10 disposed in a housing 11. An object plane 12, an illumination means including a light source 13 and condenser lens assembly 14 are also included in the device. As illustrated the microscope is adapted for trans-illuminating an object or a workpiece.

The novel optical system according to the first embodiment of the invention includes a pair of coaxial lens systems each of which form a real image at a common image plane. In the toolmaker's microscope illustrated in FIG. 1 the optical system is disposed in the housing 11 and forms a pair of images which are viewed by means of the eyepiece 10.

The two coaxial lens systems are defined as an inner and outer lens system in the same manner as the first embodiment. In the first embodiment the outer lens system includes a pair of double convex annular lenses 20, 20' having an inner wall which define a pair of openings 21, 21' or apertures therein. The openings 21, 21' lie on the axis of the system. The inner lens system including a pair of double convex lenses 22 and 22' forms an erect image which is coplanar with the image formed by the outer system. In this embodiment the lenses 22, 22' are disposed in the openings 21, 21' and in optical alignment with the outer lenses.

Both the inner and outer lens systems may be adjusted to obtain unit magnification and for focusing the system. For example, lens 20 may be adjusted with respect to lens 20' and lens 22 may be moved with respect to lens 22'. In other cases it may be desirable to move the inner system with respect to the outer system in order to obtain adjustment.

The lenses 22 and 22' are spaced apart and have an intermediate common image plane in the inter lens space, therefore, the lens 22 forms an aerial image which is imaged by the lens 22' at the common image plane. The image formed by the inner lens system is mutually reversed with respect to the image formed by the outer lens system and when the object is on the optical axis of the system the mutually reversed images will be superimposed one upon the other.

In some cases it is desrable to include filters $f$, $f'$ in the system. One example is to place a red filter in front of the outer lens system and a green filter in front of the inner lens systems. This has the effect of producing different colored images when an object is not aligned with the optical axis of the system. By selecting different colors such as blue and yellow it is also possible to obtain a color change when the images are superimposed.

A scale read-out system according to a second embodiment of the invention, is shown in FIGS. 3 and 4. The system includes means for projecting an image of a scale division onto a screen 40. The illumination means comprises a light source 42 and a condenser lens 44, which are adapted to illuminate a scale 46. The scale 46 usually includes opaque markings such as dark lines on a transparent substrate. In other cases, however, it may be desirable to use a scale having transparent markings and an opaque background.

The imaging portion of the optical read-out system which is shown schematically in FIG. 4 is shown more clearly in FIG. 3. The imaging portion includes two coaxial lens systems each of which form real images at a common image plane. In FIG. 4 for example, the common image plane is the screen 40.

The two coaxial lens systems may be defined as a center lens system and an annular lens system. The annular lens system includes a ring-shaped positive lens 30 having an inner wall which defines an opening, or aperture therein. The opening lies on the axis of the system. The center lens system including a pair of positive lenses 32 and 32′ forms an erect image in which the cones of the image forming light rays pass through the opening 31.

The positive lenses 32 and 32′ are spaced apart and the image rays passing therebetween cross at a point in the inter-lens space. The inner lens system forms an image which is coincident with the image formed by the outer lens system. The image formed by the inner lens system and the image formed by the outer lens system are mutually reversed. The inner lenses may be adjusted to obtain unit magnification and for focusing the system. Lenses 32 and 32′ are achromatic and properly corrected to deliver aberration free image, as it is required in measuring instruments of this kind.

The outer lens 30 is shown as an achromatic triplet, but can be any kind of configuration of a corrected lens. The outer lens 30 has an inner wall which defines a circular opening, concentric with the optical axis of the system. The outer lens forms a real image of an object on an image plane. The real image formed by the lens 30 is radially inverted and mutually reversed with respect to the image formed by the inner lens system.

In the first embodiment the first lens 32′ forms an aerial image at the ray intersection point which is at approximately the center of the opening 31. This aerial image is inverted, however, it is imaged by the lens 32 to thereby form an erect image at the common image plane. This erect image is mutually reversed with respect to the image formed by the outer lens system. When the object is in axial alignment with the system these images are superimposed.

In some cases it may be desirable to locate the screen 40 at the image plane 47. In this arrangement unit magnification is obtained. However, it may be desirable to locate a projection lens 48 on the axis of the system for projecting a magnified image to the screen 40. As illustrated, the conjugate distance of the lens 48 are two to one in order to obtain 2X magnification. Other choices of magnification are within the scope of the invention.

The field of view shown in FIGS. 5 and 6 show a screen including an index line 50. In FIG. 5 images 51 and 51′ correspond to a pair of images of a small hole formed by a lens system according to the invention when the scale division is not on the optical axis of the system. The mutually reversed images 51 and 51′ are radially inverted about the optical axis of the lens systems shown as the intersections of the horizontal and vertical axes 50 and 50′. Each point on one image has a complementary point displaced 180 angular degrees. FIG. 6 shows the single mutually reversed images superimposed on each other formed by the lens systems when the small hole is on the optical axis of the system. From these two figures it can be seen that when the small hole approaches the optical axis, the mutually reversed images approach each other until such time that they become superimposed. At this point the hole being centered is on the optical axis of the system.

What is claimed is:

1. An optical system comprising an object plane, an image plane, and means including two coaxial lens systems which are adapted to receive light from a light source and to form mutually reversed images at said image plane, a first of said lens systems including a positive annular lens defining an opening therein on the optical axis of the two part system, the second of said systems including a pair of positive lenses spaced apart and having a ray intersection point in the inter lens space, said concentric lens systems forming mutually reversed images of substantially equal magnification at said image plane, which images are superimposed when the object is on the optical axis of the system.

2. An optical system for positioning an object comprising center lens means for forming a first real image of the object in an image plane;
    annular lens means for forming a second real image of the object in the image plane reversed from the first image, the annular lens means being coaxially aligned with the center lens means;
    means for viewing the images; and
    means for illuminating the object, whereby radially inverted images appear separate when the object is displaced from a position coaxial with said optical system and the images are superimposed when the object is in the coaxial position.

3. The optical system of claim 2 wherein the center and annular lens means provide substantially equal magnification of the object.

4. The optical system of claim 2 wherein the center lens system includes two spaced positive lenses having an intermediate common ray intersection point.

5. The optical system of claim 2 including an image screen and means for projecting a scale image onto the image screen.

References Cited
UNITED STATES PATENTS

| | | | |
|---|---|---|---|
| 2,058,484 | 10/1936 | Mihalyi | 88—2.4 |
| 2,136,995 | 11/1938 | Rinkel | 88—2.7 |
| 2,402,856 | 6/1946 | Turrettini | 88—14 X |

JEWELL H. PEDERSEN, *Primary Examiner.*

A. A. KASHINSKI, *Assistant Examiner.*